United States Patent [19]

Jones et al.

[11] Patent Number: 4,844,140
[45] Date of Patent: Jul. 4, 1989

[54] RELEASABLE DRIVE ASSEMBLY

[75] Inventors: Richard E. Jones, Carlingford; Mitchell J. Billows, Bankstown, both of Australia

[73] Assignee: Byrne & Davidson Doors (N.S.W.) Pty. Limited, New South Wales, Australia

[21] Appl. No.: 4,982

[22] Filed: Jan. 20, 1987

[30] Foreign Application Priority Data

Apr. 15, 1986 [AU] Australia .............................. PH5470

[51] Int. Cl.$^4$ .............................................. E06B 9/20
[52] U.S. Cl. .................................. 160/310; 192/67 R; 192/93 B
[58] Field of Search ............... 160/310, 133, 311, 312; 192/67 R, 93 A, 93 B, 93 R; 74/405

[56] References Cited

U.S. PATENT DOCUMENTS

| | | | |
|---|---|---|---|
| 2,670,065 | 2/1954 | Stevens, Jr. ..................... | 160/310 X |
| 3,285,089 | 11/1966 | Tsugawa .......................... | 160/133 X |
| 3,578,118 | 5/1971 | Wetzel .......................... | 192/67 R X |
| 4,060,310 | 11/1977 | Brown ............................ | 160/310 X |
| 4,566,566 | 1/1986 | Vuillet .............................. | 192/93 R |

FOREIGN PATENT DOCUMENTS 2325755 12/1974 Fed. Rep. of Germany ...... 160/310

Primary Examiner—Blair M. Johnson
Attorney, Agent, or Firm—Pennie & Edmonds

[57] ABSTRACT

A releasable drive assembly is described, suitable for use with a rolling door. The illustrated assembly comprises a chassis, a final drive unit rotatably mounted to the chassis for operating the door, a motor fixed with respect to the chassis, drive means interconnecting the motor with the final drive unit, the drive means including a clutch for releasing and re-engaging the motor and the final drive unit, the clutch including a slidable clutch unit keyed for rotation with one part of the drive means and having axially projecting formations respectively engageable and disengageable with mating formations on the other part of the drive means upon sliding movement of the clutch unit, latchable disengagement means for selective engagement with the slidable clutch unit for sliding the clutch unit into and out of engagement with the mating formations, the disengagement means being latchable to hold the clutch unit in its disengaged position.

10 Claims, 8 Drawing Sheets

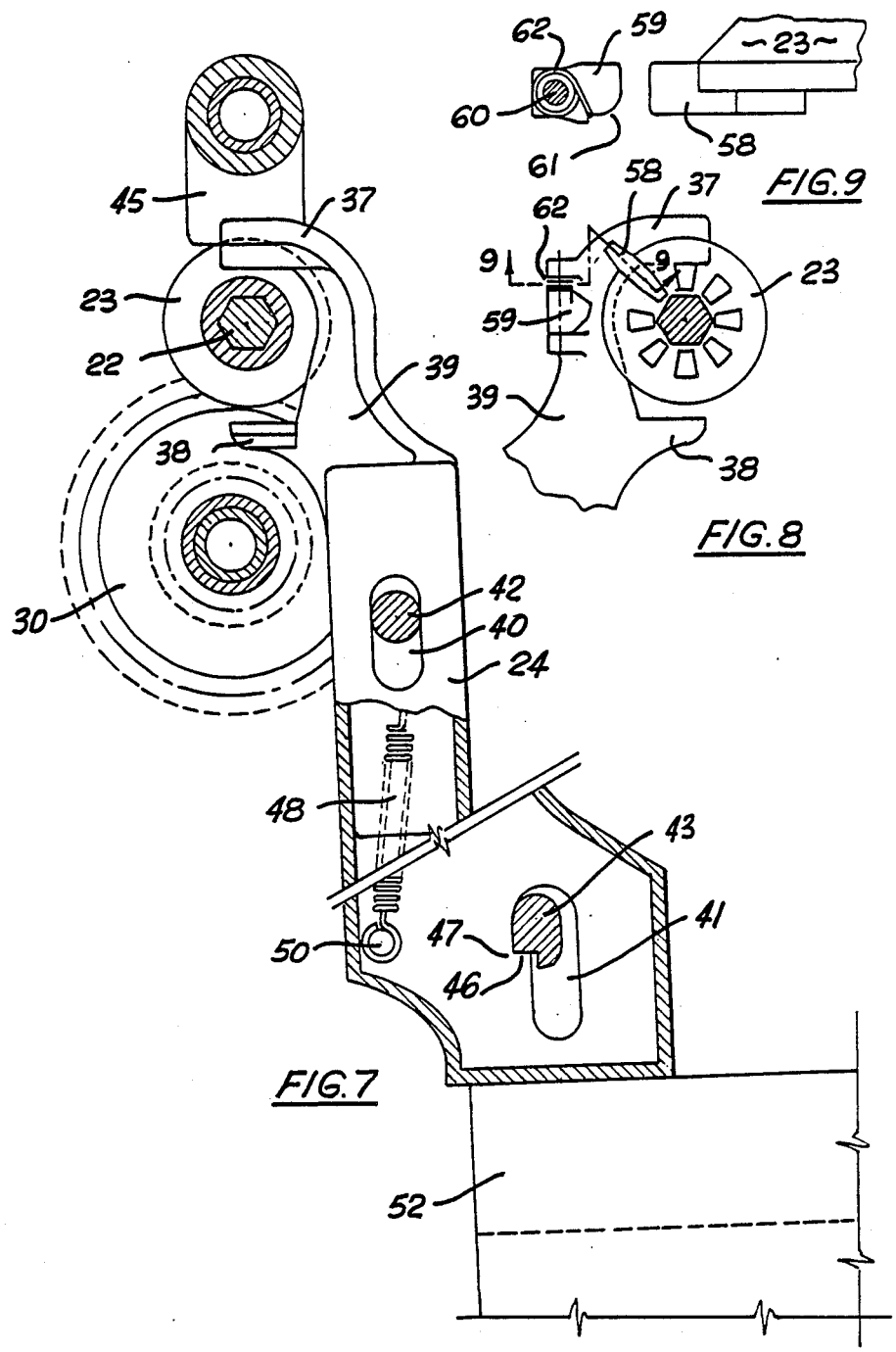

RELEASABLE DRIVE ASSEMBLY

The present invention relates to an improved means for driving rolling doors.

Although the invention was developed primarily for use with rolling doors it will be appreciated that it is not limited to this particular field of use. It may be applied to other forms of doors such as tilting or slat shutter doors as well as any other engineering installation requiring a releasable drive means.

Rolling doors are well known and comprise a flexible door curtain which can be raised and lowered from a drum located above the door aperture. It is well known to employ a pair of end drums rotatably mounted on a fixed axle extending horizontally across the top of the door aperture. The curtain is secured at its upper end to each of the spaced end drums, one of which engages a ring gear which may be provided with a motor drive for rotating the drum and thereby raising or lowering the door.

It is desirable for many reasons to employ a drive release mechanism and one such unit is disclosed in Australian Patent Specification 519,424. That unit employed a pivotally mounted motor drive unit which could be rotated out of engagement with the ring gear by manually releasing a latch. Drive was re-established by manually rotating the drive unit back into engagement with the ring gear.

This unit worked well but the re-engagement system effectively required the operator to set the drive clearance between the drive pinion and the ring gear. This occasionally resulted in incorrect clearances with associated jamming or tooth wear. The unit was also entirely manually operable and was not adapted for automatic re-engagement.

It is an object of the present invention to provide a releasable drive assembly in which engagement and re-engagement does not require relative transverse motion of any rotatable drive elements. Furthermore, it is an object of a particularly preferred embodiment of the invention to provide a releasable drive assembly in which drive re-engagement is effected automatically upon actuation of the motor, without any need for manual intervention.

According to the invention there is provided a releasable drive assembly suitable for use with a rolling door comprising a chassis, a final drive unit rotatably mounted to said chassis for operating said door, a motor fixed with respect to said chassis, drive means interconnecting said motor with said final drive unit, said drive means including a clutch for releasing and re-engaging said motor and said final drive unit, said clutch including a slidable clutch unit keyed for rotation with one part of said drive means and having axially projecting formations respectively engageable and disengageable with mating formations on the other part of said drive means upon sliding movement of said clutch unit, latchable disengagement means for selective engagement with said slideable clutch unit for sliding said clutch unit into and out of engagement with said mating formations, said disengagement means being latchable to hold said clutch unit in its disengaged position.

Preferably, the disengagement means is resiliently biased towards its position of re-engagement such that re-engagement is effected automatically upon de-latching of the disengagement means.

In a particularly preferred form of the invention, the slidable clutch unit is keyed for rotation with the motor and includes a striker lug engageable with an anvil member on the disengagement means upon rotation of the clutch unit, thereby to de-latch the disengagement means and effect automatic drive re-engagement upon actuation of the motor.

In this last mentioned embodiment it is also particularly preferable for the anvil member to be hinged to permit the striker lug to traverse the anvil member in an axial direction in order to permit disengagement in all angular positions of the clutch unit.

A preferred embodiment of the invention adapted for use with a rolling door will now be described, by way of example only, with reference to the accompanying drawings in which:

FIG. 7 is a view taken on line 7—7 of FIG. 5.

FIG. 8 is a view taken in the opposite direction to line 6—6 of FIG. 5.

FIG. 9 is an enlarged view taken on line 9—9 of FIG. 8.

Figure 4:
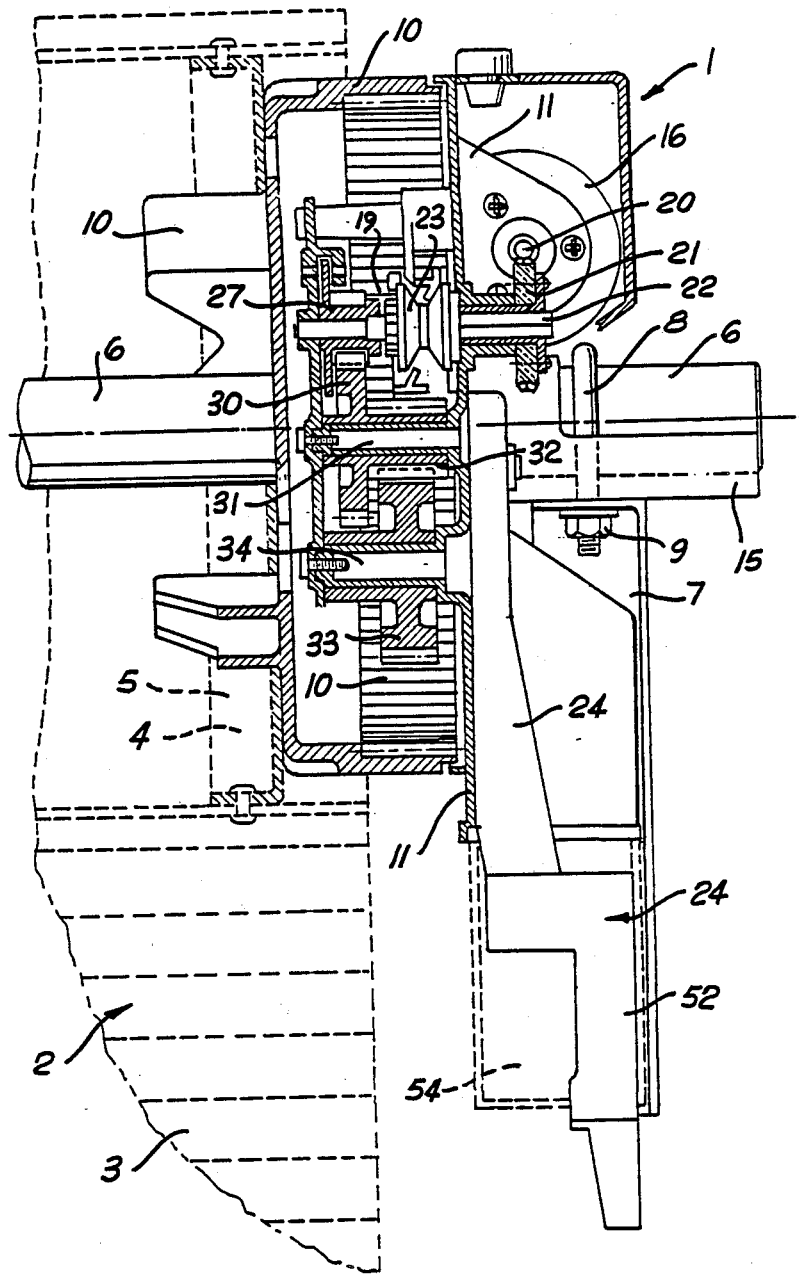
FIG. 4 is a sectional side elevation taken on line 4—4 on FIG. 3, showing the assembly attached to a rolling door.

Referring to the drawings, the releasable drive assembly 1 is shown in its preferred form for use with a rolling door 2, as illustrated in FIG. 4. The rolling door 2 includes a flexible door curtain 3 which can be raised and lowered from a drum 4 located above the door aperture. The drum 4 is defined by a pair of end drums 5 of which only one is shown. The end drums are rotatably mounted on fixed axle 6 extending across the top of the door aperture. The axle is secured at its opposite ends to mounting brackets 7 by means of U-bolts 8 and locking nuts 9.

The drum 4 is rotated by a ring gear 10 which engages the end drum 5 and forms the final drive unit of the releasable drive assembly 1.

Figure 10:
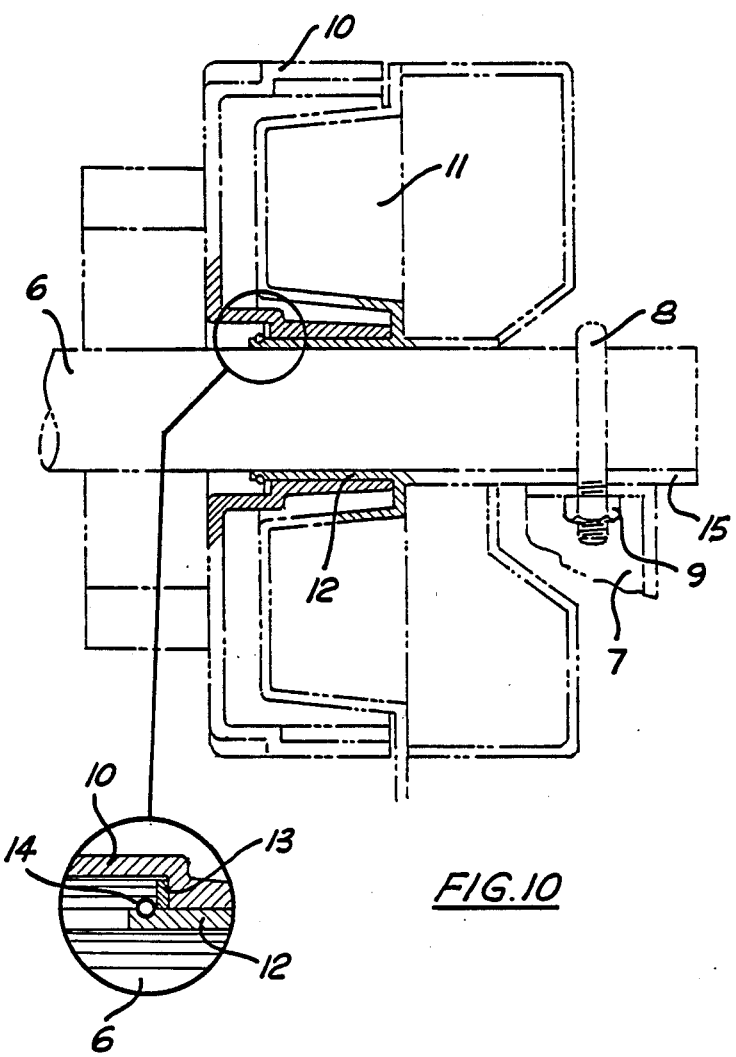
FIG. 10 is a sectional view similar to FIG. 4 showing the mounting of a ring gear to the chassis.

Referring more particularly to the drive assembly itself, this includes a chassis 11 which rotatably supports the ring gear 10 for rotation about a chassis sleeve portion 12. The ring gear 10 is secured to the chassis sleeve 12 by washer 13 and circlip 14, as best shown in FIG. 10. The chassis is rigidly secured to the mounting bracket 7 by a projecting mounting lug 15 which is sandwiched between the bracket 7 and axle 6 by U-bolt 8. The mounting lug 15 has a flat base for non-rotatable locking engagement with the mounting bracket, and axially extending elongate slots for adjustably receiving the U-bolt.

The chassis also supports an electric motor 16 and a drive means 17 which includes a gear train 18 and a clutch 19 for releasing and re-engaging the motor 16 and the ring gear 10.

Figures 5, 6:
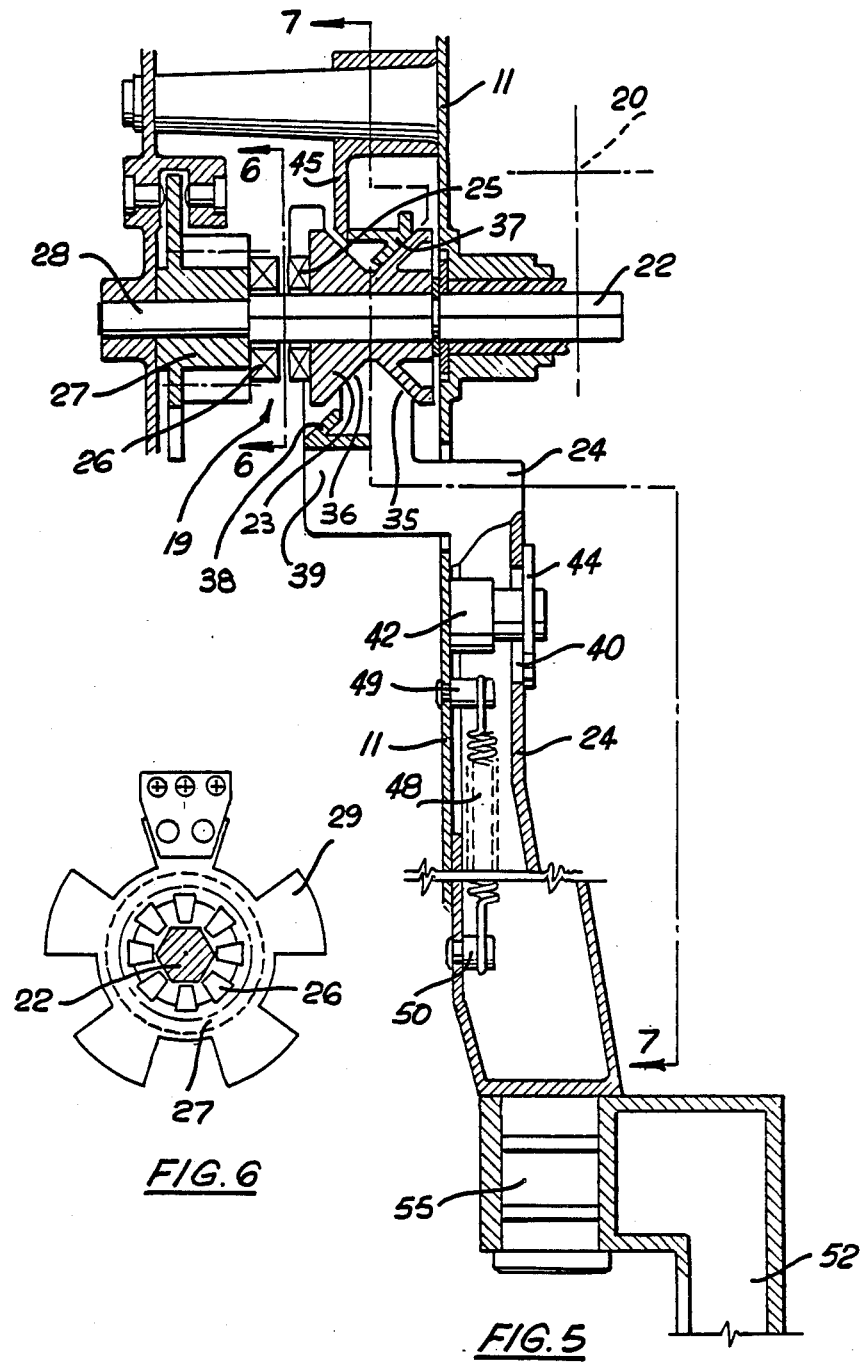
FIG. 5 is an enlarged view of part of the assembly shown in FIG. 4.
FIG. 6 is a view taken on line 6—6 of FIG. 5.

Commencing with the motor spindle 20, the drive passes via worm wheel 21 to hexagonal shaft 22. A slidable clutch unit 23 is keyed for rotation with the hexagonal shaft 22 and for relative sliding motion under the action of a latchable disengagement handle 24, to be described below. The slidable clutch unit 23 includes axially projecting formations 25 which are engageable with mating formations 26 formed on the adjacent, co-axial gear 27. With the slidable clutch unit 23 disengaged, as best shown in FIG. 5, the axially adjacent gear 27 is free to rotate about a cylindrical portion 28 of shaft 22. The gear 27 also includes position sensing means 29 which do not form part of the present invention.

From gear 27 the drive passes to an intermediate gear 30 rotatable about shaft 31 and thence from its integral stepped gear 32 to drive pinion 33 rotatable about shaft 34. The drive pinion 33 is in permanent engagement with the internally toothed ring gear 10.

Referring now to FIGS. 5 and 7, it will be seen that the slidable clutch unit 23 includes a pair of opposed conical faces 35 and 36. These faces are respectively engageable by upper and lower opposed arms 37 and 38 defining part of a yolk formation 39 on the latchable disengagement handle 24.

The handle 24 includes two slots 40 and 41 respectively engaging pins 42 and 43 projecting from the chassis 11. Washers 44 and guide 45 restrain the handle for motion in a single plane. It will be appreciated that the handle can both slide and partly rotate with respect to the pin 42 within the confines of slot 40.

The pin 43 includes a latching formation 46 which engages a corresponding abutment face 47 on the handle in the drive-disengaged position illustrated in FIGS. 3, 4, 5 and 7. The handle is maintained in this latched configuration by a tension spring 48 extending between a pin 49 on the chassis and a corresponding pin 50 on the handle. The spring 48 resiliently biases the handle upwardly, with the latching formation 46 holding the handle in its lower position of drive disengagement. In this position, the slidable clutch unit 23 is held in its disengaged position by yolk arm 37 bearing against conical surface 35.

Figure 12:
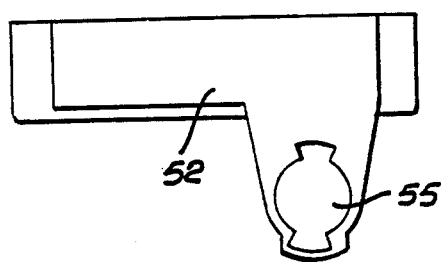
FIG. 12 is a plan view of the hand grip unit shown in FIG. 11.
Figure 13:
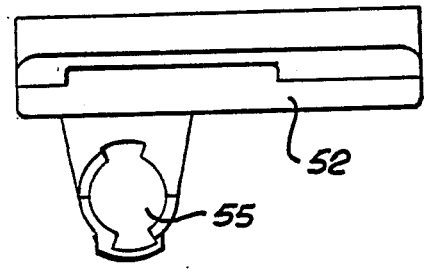
FIG. 13 is an underside view of the hand grip unit shown in FIG. 11.
Figure 11:
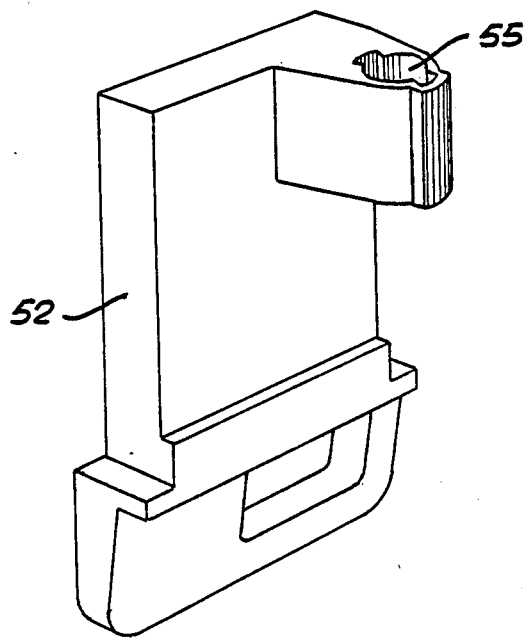
FIG. 11 is a perspective view of a hand grip unit.

The handle 24 is manually accessible by means of a removable bayonet mounted hand grip unit 52 as best shown in FIGS. 11, 12 and 13. The hand grip 52 can be removed from the handle shank by first removing the lamp housing 54 and then rotating the hand grip about its mounting stub 55 from which it can then be downwardly withdrawn.

Figure 1:
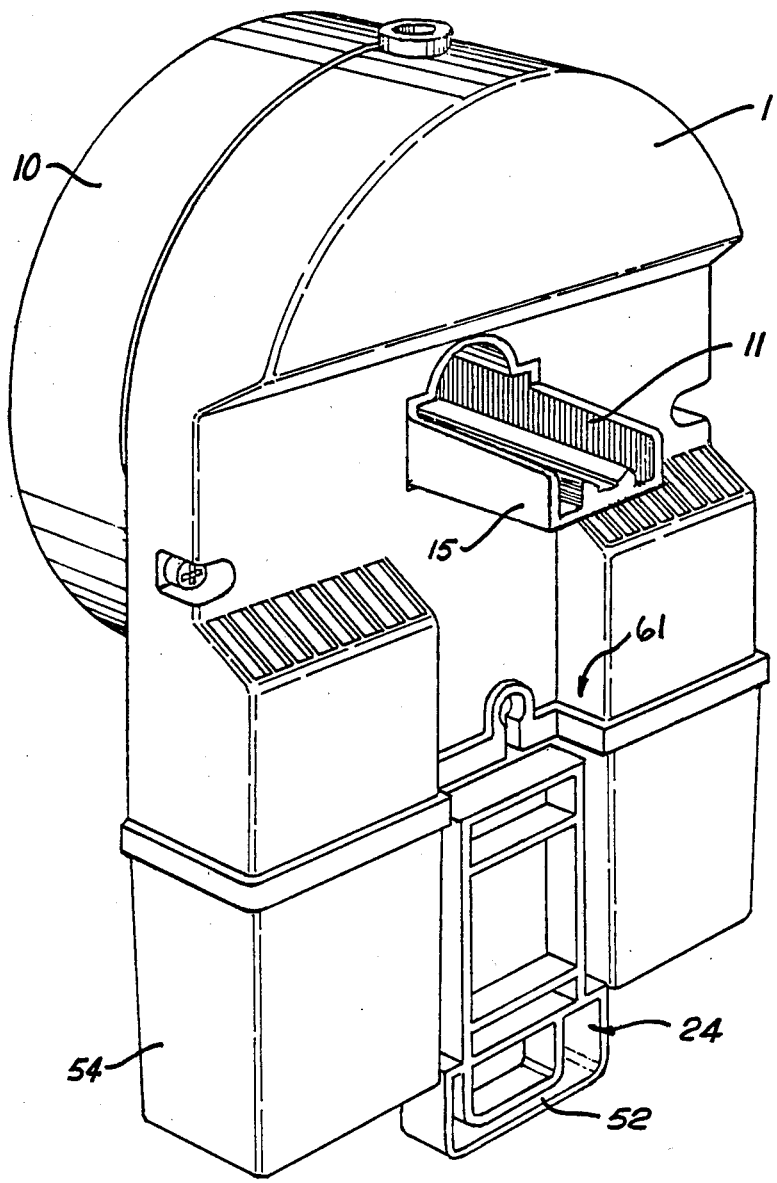
FIG. 1 is a perspective view of a releasable drive assembly according to the invention, the assembly being shown in the engaged configuration.
Figure 2:
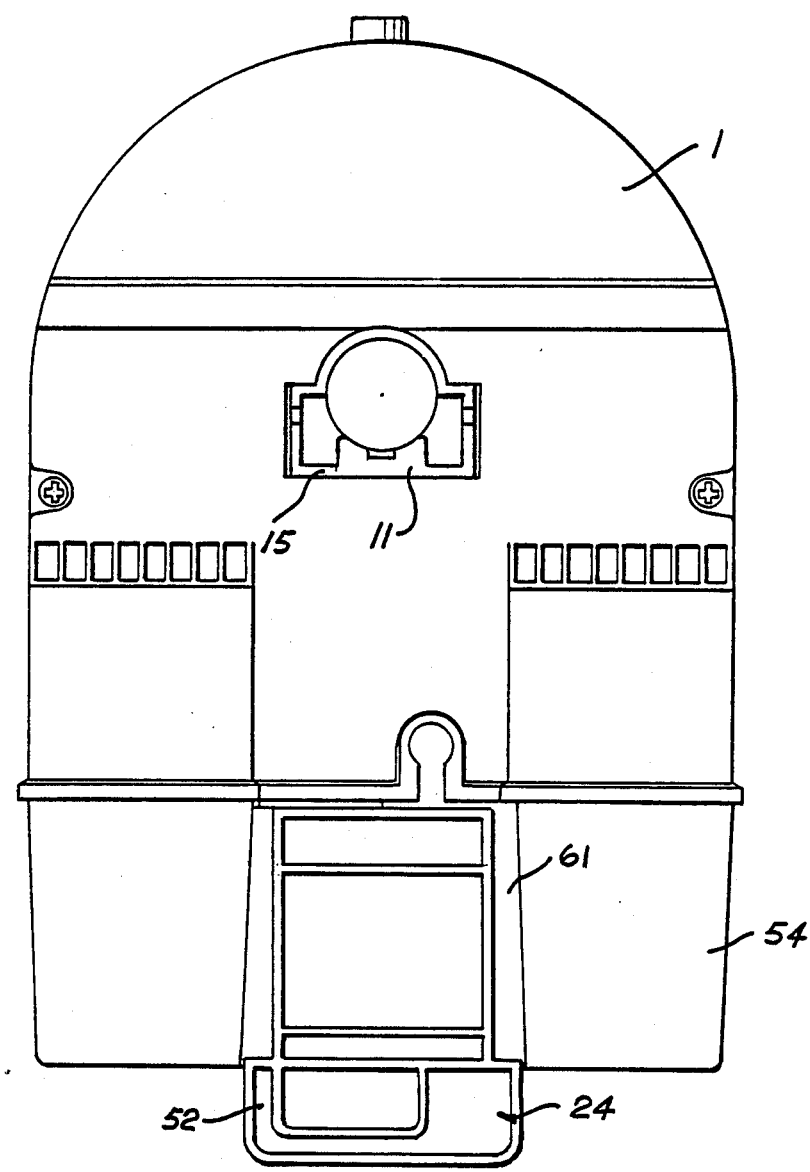
FIG. 2 is an end elevation of the assembly shown in FIG. 1
Figure 3:
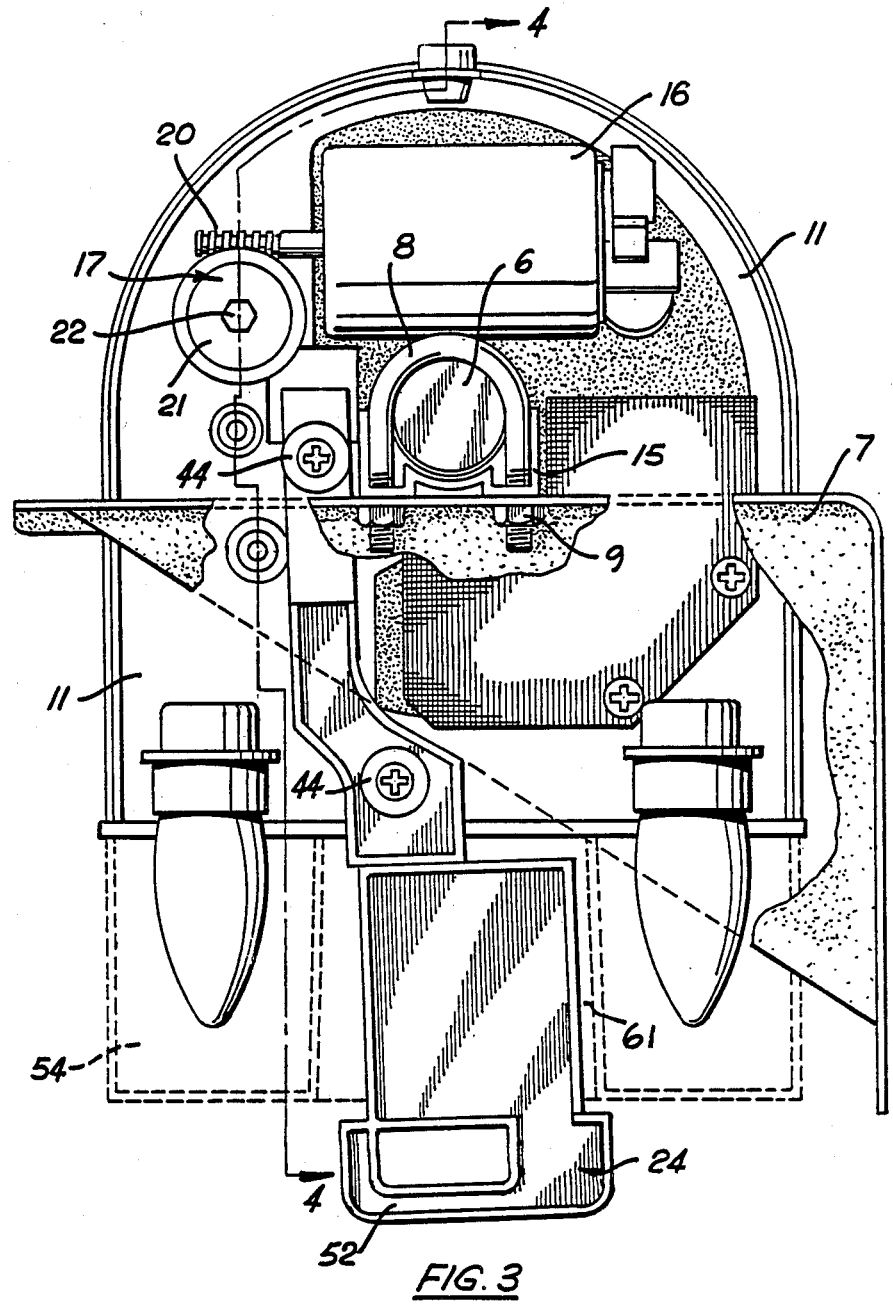
FIG. 3 is a cut-away end elevation of the assembly, showing it attached to a mounting bracket. In this case the assembly is shown in the dis-engaged configuration.

As best shown in FIGS. 1, 2 and 3 the hand grip unit 52 extends along a central vertical channel 61, thereby to permit the assembly to be used in both left hand and right hand installations.

To effect drive re-engagement, the hand grip 52 is moved slightly sideways, to the left in FIG. 7, so as to slide the handle abutment face 47 out of engagement with the latching formation 46 on latch pin 43. Clearance in the slot 41 permits this to occur and the spring 48 then immediately returns the handle to its uppermost position. As this occurs, yolk arm 38 engages the conical surface 36 on the slidable clutch element 22 and moves it into driving engagement with the mating formations on gear 26. This is effected automatically by the return spring 48.

In order to disengage the drive, the handle is moved downwardly and to the right into the position indicated in FIGS. 3, 4, 5 and 7 such that yolk arm 37 bearing against conical surface 35 moves the slidable clutch unit 23 out of engagement with the mating formations 26 on the axially adjacent gear 27.

In a particularly preferred form of the invention, the drive may be automatically re-engaged upon actuation of the drive motor, without the need for manual release. This is achieved by providing the slidable clutch unit 23 with a striker lug 58. This striker lug 58 is engageable with an anvil member 59 which is mounted on the handle yolk 39 as best shown in FIG. 8.

When the motor is acutated, the slidable clutch unit rotates and the striker lug 58 sharply engages the anvil member 59, thereby forcing the handle downwardly and away from the shaft 22 such that the handle is automatically released from the latch pin 43. As the bottom end of the handle moves to the left in FIG. 7, the return spring 48 automatically moves the handle upwardly such that yolk arm 38 engages the slidable clutch unit 23, moving it to the left and into driving engagement with gear 27.

Preferably, the anvil member 59 is hingedly mounted to the handle yolk for rotation about axis 60. This preferred feature removes the need to re-start the drive in order to re-position the striker lug if it has previously stopped in an angular position of axial interference with the anvil member. This would otherwise have prevented disengagement since movement of the clutch unit towards the position of disengagement would have brought the striker lug into a position of interference with the anvil member. It would then have been necessary momentarily to re-actuate the motor to take the striker lug out of register with the anvil member and then to effect the desired disengagement.

While this preferred feature is not essential to the operation of the invention it is preferable because it permits the striker lug to traverse the anvil member in an axial direction to permit disengagement in all angular positions of the clutch unit.

As best shown in FIG. 9, the hinged anvil member is preferably provided with a contoured leading edge 61 against which the striker lug can slide when traversing and a return spring 62 for returning the hinged anvil member to the illustrated rest position.

Other forms of hinged anvil members can be used. For example, a rotatably mounted "gear-type" anvil member would be traversible by rotation, having an infinite number of rest positions and not requiring resilient bias.

Although the invention has been described with reference to specific examples, it will be appreciated by those skilled in the art that the invention may be embodied in many other forms.

We claim:

1. A releasable drive assembly suitable for use with a rolling door comprising a chassis, a final drive unit rotatably mounted to said chassis for operating said door, a motor fixed with respect to said chassis, drive means interconnecting said motor with said final drive unit, said drive means including a clutch for releasing and re-engaging said motor and said final drive unit, said clutch including a slidable clutch unit keyed for rotation with one part of said drive means and having axially projecting formations respectively engageable and disengageable with mating formations on the other part of said drive means upon sliding movement of said clutch unit, latchable disengagement means for selective engagement with said slidable clutch unit for sliding said clutch unit into and out of engagement with said mating formations, said disengagement means being latchable to hold said clutch unit in its disengaged position; wherein said disengagement means is resiliently biased towards its position of re-engagement such that re-engagement is effected automatically upon de-latching of said disengagement means; and wherein said slidable clutch unit includes a pair of opposed conical faces and said disengagement means includes a pair of opposed arms, said faces being respectively engageable by said arms for sliding said clutch unit into and out of engagement upon respective actuation of said disengagement means.

2. A releasable drive assembly according to claim 1 wherein said arms are formed on a disengagement handle, said handle being slidable and partly rotatable with respect to said chassis, latching of said disengagement means being achieved by sliding said handle against said resilient bias and part rotating said handle to engage a latch fixed with respect to said chassis.

3. A releasable drive assembly according to claim 2 wherein said slidable clutch unit is keyed for rotation with said motor and includes a striker lug engageable with an anvil member formed on said disengagement handle upon rotation of said clutch unit, thereby moving said handle out of engagement with said latch such that said resilient bias effects drive re-engagement upon actuation of said motor.

4. A releasable drive assembly according to claim 3 wherein said anvil member is hinged to permit said striker lug to traverse said anvil member in an axial direction to permit disengagement in all angular positions of said clutch unit.

5. A releasable drive assembly according to claim 4 wherein said anvil member is resiliently biased back to single rest position.

6. A releasable drive assembly according to claim 5 wherein said anvil member is provided with a contoured leading edge against which said striker lug can slide when traversing said anvil member.

7. A releasable drive assembly according to claim 2 wherein said handle includes a removable bayonet mounted hand grip unit.

8. A releasable drive assembly according to claim 7 wherein said hand grip unit extends along a channel which, when the assembly is in operative position extends vertically and centrally of said assembly, thereby to permit said assembly to be used in both left hand and right hand installations.

9. A releasable drive assembly suitable for use with a rolling door comprising a chassis, a final drive unit rotatably mounted to said chassis for operating said door, a motor fixed with respect to said chassis, drive means interconnecting said motor with said final drive unit, said drive means including a clutch for releasing and re-engaging said motor and said final drive unit, said clutch including a slidable clutch unit keyed for rotation with one part of said drive means and having axially projecting formations respectively engageable and disengageable with mating formations on the other part of said drive means upon sliding movement of said clutch unit, latchable disengagement means for selective engagement with said slidable clutch unit for sliding said clutch unit into and out of engagement with said mating formations, said disengagement means being latchable to hold said clutch unit in its disengaged position; wherein said disengagement means is resiliently biased towards its position of re-engagement such that re-engagement is effected automatically upon de-latching of said disengagement means; and wherein said slidable clutch unit is keyed for rotation with said motor and includes a striker lug engageable with an anvil member on the disengagement means upon rotation of said clutch unit, thereby to de-latch said disengagement means and effect automatic drive re-engagement upon actuation of said motor.

10. A releasable drive assembly according to claim 9 wherein said anvil member is hinged to permit said striker lug to traverse said anvil member in an axial direction in order to permit disengagement in all angular positions of said clutch unit.

* * * * *